United States Patent
Hashimoto et al.

(10) Patent No.: US 9,399,500 B1
(45) Date of Patent: Jul. 26, 2016

(54) BICYCLE WIRELESS CONTROL SYSTEM

(71) Applicant: Shimano Inc., Sakai, Osaka (JP)

(72) Inventors: Akinori Hashimoto, Osaka (JP); Takaya Masuda, Osaka (JP)

(73) Assignee: Shimano Inc., Osaka (JP)

( * ) Notice: Subject to any disclaimer, the term of this patent is extended or adjusted under 35 U.S.C. 154(b) by 28 days.

(21) Appl. No.: 14/639,012

(22) Filed: Mar. 4, 2015

(51) Int. Cl.
*H04W 4/00* (2009.01)
*B62M 9/122* (2010.01)
*G08C 17/02* (2006.01)
*B62M 9/132* (2010.01)
*B62M 9/12* (2006.01)

(52) U.S. Cl.
CPC ............... *B62M 9/122* (2013.01); *B62M 9/12* (2013.01); *B62M 9/132* (2013.01); *G08C 17/02* (2013.01)

(58) Field of Classification Search
CPC ........................................................ H04W 4/00
USPC ............................................................ 701/36
See application file for complete search history.

(56) References Cited

U.S. PATENT DOCUMENTS

| | | | | |
|---|---|---|---|---|
| 2009/0240858 A1* | 9/2009 | Takebayashi | .......... | B62M 25/08 710/110 |
| 2011/0320093 A1* | 12/2011 | Kitamura | ............... | B62M 25/08 701/51 |
| 2014/0102237 A1* | 4/2014 | Jordan | .................. | B62K 23/02 74/473.12 |

* cited by examiner

*Primary Examiner* — John Q Nguyen
*Assistant Examiner* — Anshul Sood
(74) *Attorney, Agent, or Firm* — Global IP Counselors (57) ABSTRACT

A bicycle wireless control system is basically provided with a first electric component and a second electric component. The first electric component includes a wireless transmitter that wirelessly transmits a plurality of control signals in response to a single operation of at least one operating member. Each of the control signals is transmitted for a predetermined transmission period at a predetermined non-transmission interval between adjacent ones of the control signals. The second electric component includes a wireless receiver and a controller. The wireless receiver wirelessly receives the control signal. The controller periodically operates the wireless receiver for at least two predetermined listening periods that each includes a set of predetermined listening periods with a non-listening interval therebetween. A predetermined non-listening interval is further provided between the set of the predetermined listening periods, which is larger than each of the intermediate predetermined non-listening intervals.

13 Claims, 6 Drawing Sheets

BICYCLE WIRELESS CONTROL SYSTEM

BACKGROUND

1. Field of the Invention

This invention generally relates to a bicycle wireless control system. More specifically, the present invention relates to a bicycle wireless control system which includes a wireless receiver.

2. Background Information

In recent years, some bicycles are provided with electric components or devices to make it easier for the rider to operate the bicycle. In more recent years, bicycle control systems exist that wirelessly control these electric bicycle components or devices. A bicycle wireless control system is advantageous in that electrical cables connecting bicycle electrical components to each other can be omitted. Examples of some these electric bicycle components include suspensions, transmission devices (e.g., derailleurs, internally geared hubs, etc.) and seatposts. Typically, bicycles equipped with electric bicycle components are also provided an operating device for each of the electric bicycle components.

SUMMARY

In accordance with a first aspect of the present disclosure, a bicycle wireless control system is provided that basically comprises a first electric component and a second electric component. The first electric component includes a wireless transmitter that wirelessly transmits a plurality of control signals in response to a single operation of at least one operating member. Each of the control signals is transmitted for a predetermined transmission period at a predetermined non-transmission interval between adjacent ones of the control signals. The second electric component includes a wireless receiver and a controller. The wireless receiver wirelessly receives the control signal. The controller periodically operates the wireless receiver for at least two predetermined listening periods that each includes a set of predetermined listening periods with a non-listening interval therebetween. A predetermined non-listening interval is further provided between the set of the predetermined listening periods, which is larger than each of the intermediate predetermined non-listening intervals.

In accordance with a second aspect of the present invention, the bicycle wireless control system according to the first aspect is configured so that the predetermined non-transmission interval is smaller than each of the first predetermined listening period and the second predetermined listening period as either measured from a start of the first initial predetermined listening period to an end of the first closing predetermined listening periods or measured from a start of the second initial predetermined listening period to an end of the second closing predetermined listening period.

In accordance with a third aspect of the present invention, the bicycle wireless control system according to the first aspect is configured so that the predetermined non-listening interval satisfies F<{(n−1)A+(n−2)B} where: F is the predetermined non-listening interval; A is the predetermined transmission period; B is the predetermined non-transmission interval; and n is a total number of the control signals during a single operation of the at least one operating member and is greater than one.

In accordance with a fourth aspect of the present invention, the bicycle wireless control system according to the first aspect is configured so that each of the first and second intermediate predetermined non-listening intervals is smaller than the predetermined non-transmission interval.

In accordance with a fifth aspect of the present invention, the bicycle wireless control system according to the first aspect is configured so that each of the first and second initial predetermined listening periods and the first and second closing predetermined listening periods is smaller than the predetermined transmission period.

In accordance with a sixth aspect of the present invention, the bicycle wireless control system according to the first aspect is configured so that the first and second initial predetermined listening periods and the first and second closing predetermined listening periods are equal to each other.

In accordance with a seventh aspect of the present invention, the bicycle wireless control system according to the first aspect is configured so that the second electric component is a bicycle derailleur having a base member configured to be attached to a bicycle, a chain guide movably supported relative to the base member and a linkage movably supporting the chain guide relative to the base member.

In accordance with an eighth aspect of the present invention, the bicycle wireless control system according to the seventh aspect is configured so that the bicycle derailleur is a front bicycle derailleur.

In accordance with a ninth aspect of the present invention, the bicycle wireless control system according to the seventh aspect is configured so that the bicycle derailleur is a rear bicycle derailleur.

In accordance with a tenth aspect of the present invention, the bicycle wireless control system according to the first aspect is configured so that the second electric component includes an on-board power source.

In accordance with an eleventh aspect of the present invention, the bicycle wireless control system according to the first aspect is configured so that the second electric component includes an actuator. The controller is programmed to operate the actuator based on at least one of the control signals being received by the wireless receiver.

In accordance with a twelfth aspect of the present invention, the bicycle wireless control system according to the first aspect is configured so that the first predetermined listening period further includes a first additional predetermined listening period between the first initial predetermined listening period and the first closing predetermined listening period.

In accordance with a thirteenth aspect of the present invention, the bicycle wireless control system according to the twelfth aspect is configured so that the second predetermined listening period further includes a second additional predetermined listening period between the second initial predetermined listening period and the second closing predetermined listening period.

Also other objects, features, aspects and advantages of the disclosed bicycle wireless control system will become apparent to those skilled in the art from the following detailed description, which, taken in conjunction with the annexed drawings, discloses one embodiment of the bicycle wireless control system.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
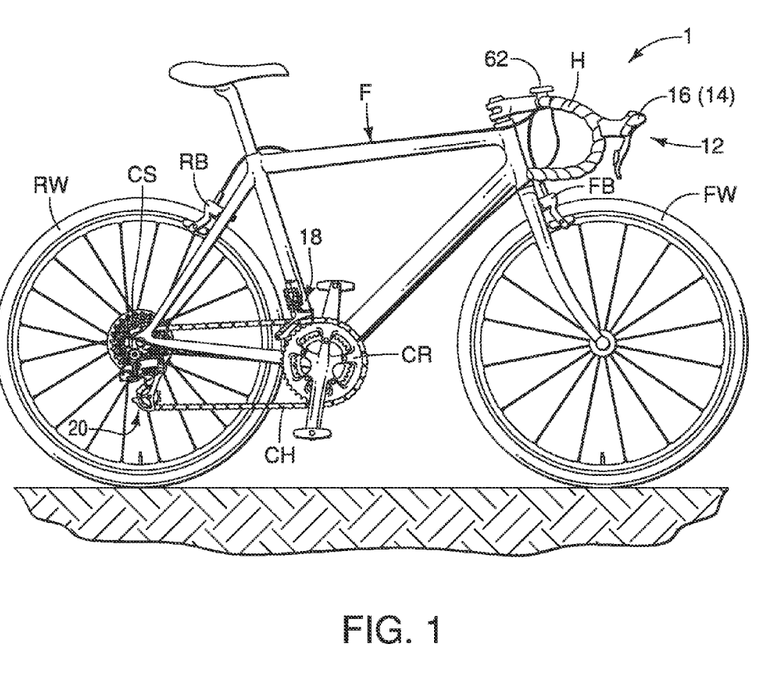
FIG. 1 is a side elevational view of a bicycle that includes a bicycle wireless control system mounted to the handlebar of the bicycle in accordance with one disclosed embodiment.

Referring initially to FIG. 1, a bicycle 1 is illustrated that is equipped with a bicycle wireless control system 12 in accordance with one illustrated embodiment. The bicycle wireless control system 12 is an electrically powered system. In the illustrated embodiment, the bicycle wireless control system 12 basically includes a first (front) shift operating device 14, a second (rear) shift operating device 16, a first (front) bicycle electric transmission device 18 and a second (rear) operating device 20. Thus, the bicycle wireless control system 12 is a bicycle electric, shifting apparatus. However, the bicycle wireless control system 12 is not limited to this particular arrangement. The bicycle wireless control system 12 can be used with other systems and/or components of the bicycle 1, such as adjustable suspension, adjustable seatposts, bicycle computers, etc.

Basically, the bicycle wireless control system 12 comprises a first electric component and a second electric component that are configured to wirelessly communicate. The first and second shift operating devices 14 and 16 are each an example of a first electric component of the bicycle wireless control system 12. In the illustrated embodiment, the first and second shift operating devices 14 and 16 are shifters that include a braking function. The first and second bicycle electric transmission devices 18 and 20 are each an example of a second electric component of the bicycle wireless control system 12. In the illustrated embodiment, the first and second bicycle electric transmission devices 18 and 20 are bicycle derailleurs. Thus, in the illustrated embodiment, the second electric component 18 or 20 is a bicycle derailleur. Specifically, the first bicycle electric transmission device 18 is a front bicycle derailleur, while the second bicycle electric transmission device 20 is a rear bicycle derailleur.

Referring to FIG. 1, the bicycle 1 includes, among other things, a bicycle frame F with a handlebar H, a front wheel FW, a rear wheel RW, a front brake FB and a rear brake RB. Referring again to FIG. 1, the front wheel FW is mounted in a conventional manner to a steering fork of the bicycle frame F below the handlebar H. The rear wheel RW includes a cassette of chain sprockets CS. The rear wheel RW is mounted in a conventional manner to a rear portion of the bicycle frame F. A chainring assembly CR, as shown in FIG. 1, is rotatably supported to a lower portion of the bicycle frame F in a conventional manner. The chainring assembly CR includes a set of chainrings mounted to the crank axle in a conventional manner. A chain C is operatively coupled between the rear sprockets and the chainrings in a conventional manner. Since the front wheel FW, the rear wheel RW, the front brake FB, the rear brake RB, the cassette CS and the chainring assembly CR are all conventional elements, no further description is provided for the sake of brevity. Also, while the bicycle 1 is illustrated as a road bicycle, the bicycle wireless control system 12 can be used with other types of bicycles.

Figure 2:
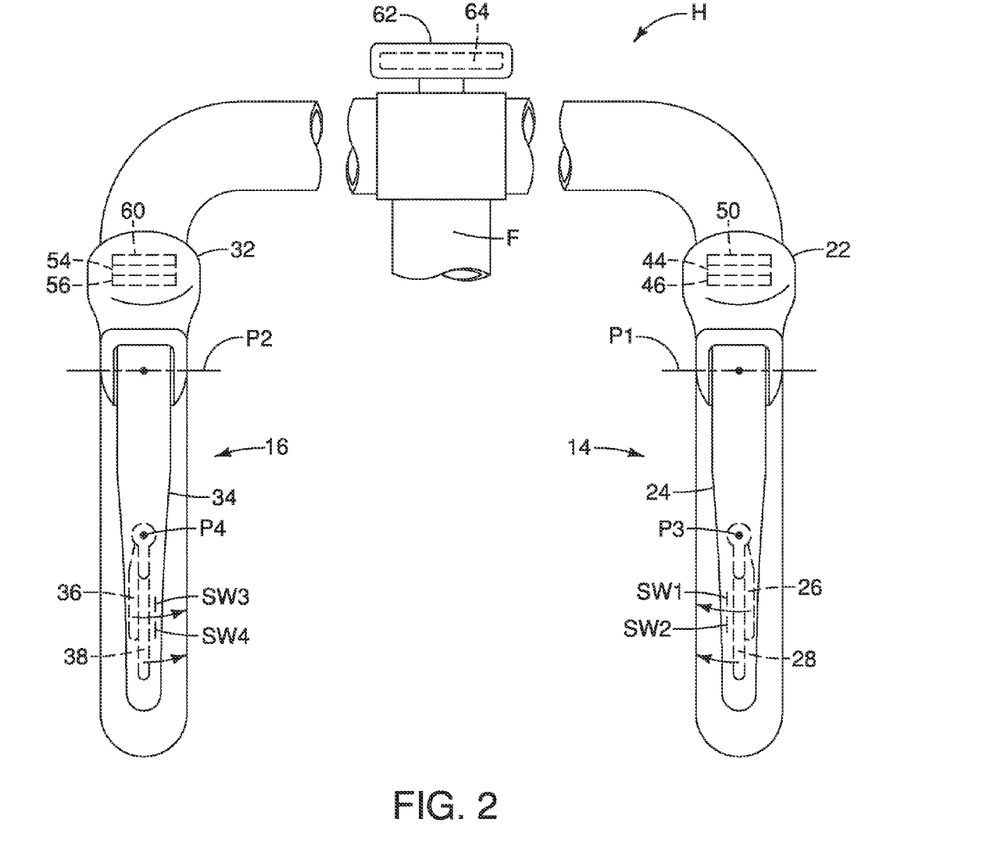
FIG. 2 is a front elevational view of a bicycle handlebar area of the bicycle illustrated in FIG. 1.
Figure 3:
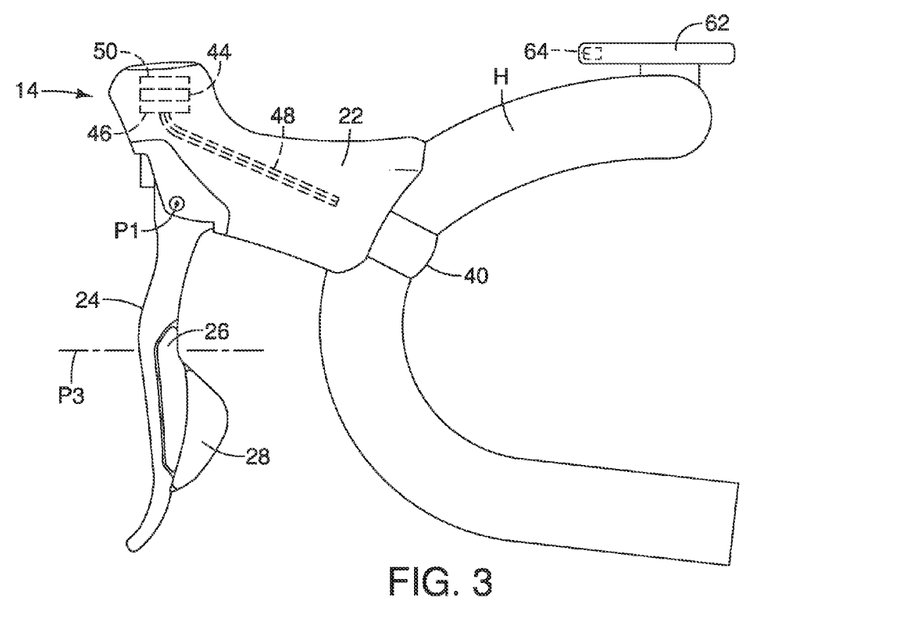
FIG. 3 is a side elevational view of the handlebar and the left or first shift operating device (front shifter) showing a left outboard side of the bicycle illustrated in FIG. 1.
Figure 4:
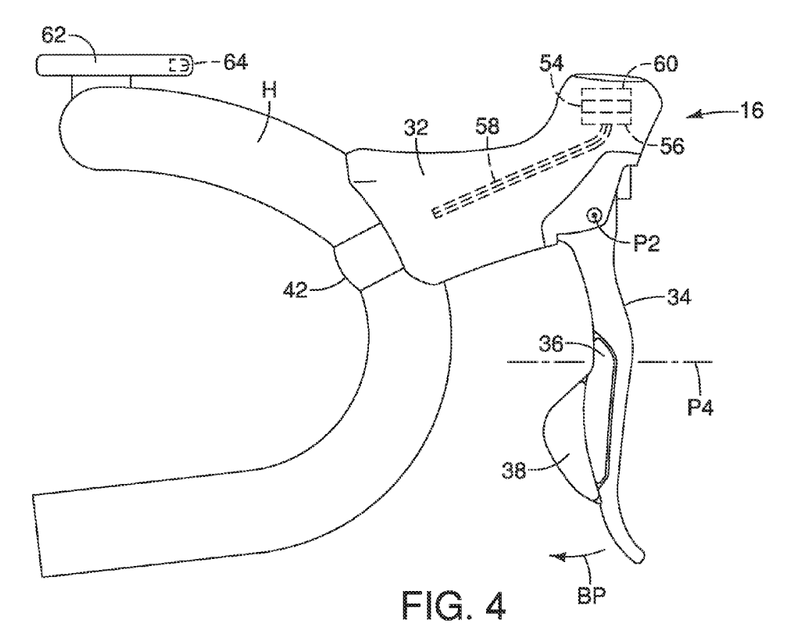
FIG. 4 is a side elevational view of the handlebar and the right or second shift operating device (rear shifter) showing a right outboard side of the bicycle illustrated in FIG. 1.

Referring now to FIGS. 2 to 4, the first and second shift operating devices 14 and 16 will now be discussed. In the illustrated embodiment, the first shift operating device 14 (i.e., left hand shift/brake operating device) controls the first bicycle electric transmission device 18 and the front brake FB. Basically, the first shift operating device 14 includes a bracket 22, a brake operating member 24, a first shift operating member 26 and a second shift operating member 28. The second shift operating device 16 (i.e., right hand shift/brake operating device) controls the second bicycle electric transmission device 20 and the rear brake RB. Basically, the second shift operating device 16 includes a bracket 32, a brake operating member 34, a first shift operating member 36 and a second shift operating member 38. It will be apparent to those skilled in the bicycle field from this disclosure that the first and second shift operating devices 14 and 16 are not limited to this configuration.

The brackets 22 and 32 are preferably made of a lightweight material such as composite materials, plastic, polymers or light weight metals such as aluminum or titanium. The first shift operating device 14 includes a bicycle frame attachment member 40 that attaches the bracket 22 to a left portion of the handlebar H in a conventional manner. The second shift operating device 16 includes a bicycle frame attachment member 42 that attaches the bracket 32 to a right portion of the handlebar H in a conventional manner. Here, the brake operating member 24 is a brake lever that is pivotally mounted to the bracket 22 about a pivot axis P1, while the brake operating member 34 is a brake lever that is pivotally mounted to the bracket 32 about a pivot axis P2. Of course, the first and second shift operating devices 14 and 16 are not limited to being mounted on the handlebar H. The first and second shift operating devices 14 and 16 can be positioned anywhere within reach of the user.

As see in FIG. 2, the first and second shift operating members 26 and 28 are pivotally mounted to the brake operating member 24 about a pivot axis P3. The first shift operating member 26 operates a switch SW1 as the first shift operating member 26 pivots about the pivot axis P3 from a rest position (FIG. 2) to an operated position. The second shift operating member 28 operates a switch SW2 as the first shift operating member 26 pivots about the pivot axis P3 from a rest position (FIG. 2) to an operated position. The first and second shift operating members 26 and 28 are trigger levers that are biased to their rest positions such that they each automatically return to their rest positions upon being released from an operated position. The term "rest position" as used herein refers to a state in which a movable part (e.g., the first and second shift operating members 26 and 28) remains stationary without the need of a user intervening (e.g., holding the movable part) to establish a state corresponding to the rest position. Thus, the term "rest position" can also be referred to as a non-operated position. The switches SW1 and SW2 can be any type of switches. For example, the switches SW1 and SW2 can include any type of toggle switch, pressure switch, contactless switch or any other suitable type of switch that provides an output signal in response to shifting movement of the first and second shift operating members 26 and 28 about the pivot axis P3 to effect upshifting and downshifting.

The first and second shift operating members 36 and 38 are pivotally mounted to the brake operating member 34 about a pivot axis P4. The first shift operating member 36 operates a switch SW3 as the first shift operating member 36 pivots about the pivot axis P4 from a rest position (FIG. 2) to an operated position. The second shift operating member 38 operates a switch SW4 as the first shift operating member 26 pivots about the pivot axis P4 from a rest position (FIG. 2) to an operated position. The first and second shift operating members 36 and 38 are trigger levers that are biased to their rest positions such that they each automatically return to their rest positions upon being released from an operated position. The switches SW3 and SW4 can be any type of switches. For example, the switches SW3 and SW4 can include any type of toggle switch, pressure switch, contactless switch or any other suitable type of switch that provides an output signal in response to shifting movement of the first and second shift operating members 36 and 38 about the pivot axis P4 to effect upshifting and downshifting.

In the illustrated embodiment, the first shift operating device 14 further includes a controller 44 and a wireless communication unit or wireless transmitter 46. The term "transmitter" as used herein includes a transceiver, transmitter-receiver, or radio, and contemplates any device or devices, separate or combined, capable of transmitting wireless signals, including shift signals or control, command or other signals related to some function of the component being controlled. The wireless transmitter 46 can be a two-way wireless communication unit if needed and/or desired.

The controller 44 is electrically connected to the switches SW1 and SW2 by electrical wires (not shown). The controller 44 is also electrically connected to the wireless transmitter 46. For example, the controller 44 and the wireless transmitter 46 can be provided on a printed circuit board that is mounted to the bracket 22. In the illustrated embodiment, the first shift operating device 14 further includes an antenna 48 that is electrically connected to the wireless transmitter 46 for transmitting signals indicative of the operation of the switches SW1 and SW2 by the first and second shift operating members 26 and 28. In the illustrated embodiment, the first shift operating device 14 further includes an on-board power source 50 that can be provided on the printed circuit board for the controller 44 and the wireless transmitter 46.

Similarly, in the illustrated embodiment, the second shift operating device 16 further includes a controller 54 and a wireless communication unit or a wireless transmitter 56. The wireless transmitter 56 can be a two-way wireless communication unit if needed and/or desired. The controller 54 is electrically connected to the switches SW3 and SW4 by electrical wires (not shown). The controller 54 is also electrically connected to the wireless transmitter 56. For example, the controller 54 and the wireless transmitter 56 can be provided on a printed circuit board that is mounted to the bracket 32. In the illustrated embodiment, the first shift operating device 16 further includes an antenna 58 that is electrically connected to the wireless transmitter 56 for transmitting signals indicative of the operation of the switches SW3 and SW4 by the first and second shift operating members 36 and 38. In the illustrated embodiment, the second shift operating device 16 further includes an on-board power source 60 that can be provided on the printed circuit board for the controller 54 and the wireless transmitter 56.

Each of the controllers 44 and 54 is preferably a microcomputer that includes conventional components such as includes a central processing unit (CPU), an input interface circuit, an output interface circuit, and storage devices such as a ROM (Read Only Memory) device, a RAM (Random Access Memory) device and/or a FLASH memory device. The controller 44 is programmed to process signals from the switches SW1 and SW2 as upshifting signals and downshifting signals, respectively, for shifting the first bicycle electric transmission device 18. The controller 54 is programmed to process signals from the switches SW3 and SW4 as upshifting signals and downshifting signals, respectively, for shifting the second bicycle electric transmission device 20.

The wireless transmitter 46 reads or otherwise receives operation signals from the controller 44, and outputs wireless control signals indicative of the operation of the SW1 and/or SW2 by the first shift operating member 26 and/or the second shift operating member 28. Similarly, the wireless transmitter 56 reads or otherwise receives operation signals from the controller 54, and outputs wireless control signals indicative of the operation of the SW3 and/or SW4 by the first shift operating member 36 and/or the second shift operating member 38. The wireless control signals can be radio frequency (RF) signals or any other type of signal suitable for wireless communications as understood in the bicycle field. It should also be understood that the wireless transmitters 46 and 56 can transmit the signals at a particular frequency and/or with an identifier such as a particular code, to distinguish the wireless control signal from other wireless control signals. In this way, the first bicycle electric transmission device 18 can recognize which control signals are upshifting signals for the first bicycle electric transmission device 18 and which control signals are downshifting signals for the first bicycle electric transmission device 18. Likewise, the second bicycle electric transmission device 20 can recognize which control signals are upshifting signals for the second bicycle electric transmission device 20 and which control signals are downshifting signals for the second bicycle electric transmission device 20. Thus, first bicycle electric transmission device 18 ignores the control signals for the second bicycle electric transmission device 20, and the second bicycle electric transmission device 20 ignores the control signals for the first bicycle electric transmission device 18.

Each of the on-board power sources 50 and 60 can include a generator configured to generate an electric power. For example, the on-board power sources 50 and 60 can include a piezoelectric element that is configured to generate the electric power by a pressure due to the operation of one of the switches SW1 to SW4.

As seen in FIGS. 2 to 4, in the illustrated embodiment, the bicycle wireless control system 12 further includes a cycle computer or control unit 62 that is mounted to a central portion of the handlebar H in a conventional manner. The control unit 62 is preferably a micro-computer that includes conventional components such as includes a central processing unit (CPU), an input interface circuit, an output interface circuit, and storage devices such as a ROM (Read Only Memory) device, a RAM (Random Access Memory) device and/or a FLASH memory device. In the illustrated embodiment, the control unit 62 includes a wireless receiver 64, which can receive information from the wireless transmitters 46 and 56 of the first and second shift operating devices 14 and 16, respectively. Alternatively, the control unit 62 can be electrically coupled to the first and second shift operating devices 14 and 16 via wires or other suitable connections.

Figure 5:
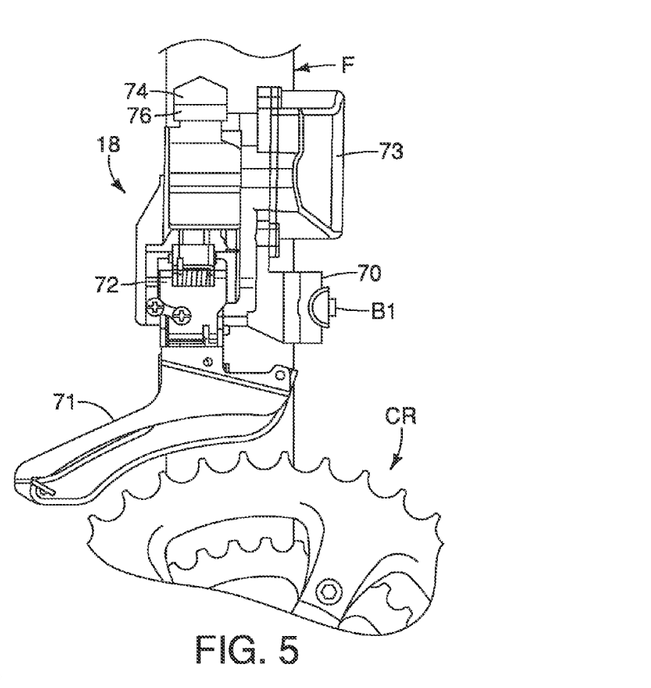
FIG. 5 is a side elevational view of the front bicycle derailleur as one of the bicycle electric transmission devices of the bicycle illustrated in FIG. 1.
Figure 6:
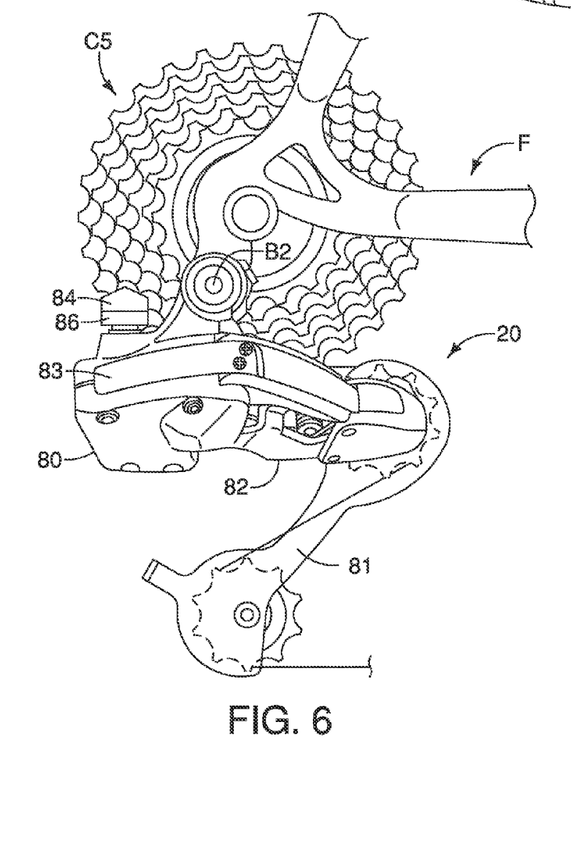
FIG. 6 is a side elevational view of the rear bicycle derailleur as one of the bicycle electric transmission devices of the bicycle illustrated in FIG. 1.

Referring now to FIGS. 5 and 6, the first and second bicycle electric transmission devices 18 and 20 will now be discussed. As mentioned above, the first and second bicycle electric transmission devices 18 and 20 are bicycle derailleurs. However, it will be apparent to those skilled in the bicycle field from this disclosure that the bicycle electric transmission devices are not limited to bicycle derailleurs. For example, the rear bicycle electric transmission device can be an internally geared hub.

As seen in FIG. 5, the first bicycle electric transmission device 18 is a front bicycle derailleur that has a base member 70, a chain guide 71 and a linkage 72. The base member 70 is configured to be attached to the bicycle 1. In particular, the base member 70 is attached to the bicycle frame F adjacent to the chainring assembly CR by a bolt B1. The chain guide 71 is movably supported relative to the base member 70. Specifically, in the illustrated embodiment, the linkage 72 movably supports the chain guide 71 relative to the base member 70. Here, the linkage 72 includes two links that are pivotally connected between the base member 70 and the chain guide 71 to form a four-bar linkage.

The chain guide 71 is configured to move the chain C between the chainrings of the chainring assembly CR in response to the operation of the first shift operating device 14 of the bicycle wireless control system 12. More specifically, the first bicycle electric transmission device 18 (the second electric component) further includes an electric motor or actuator 73 that is mechanically connected to the linkage 72. Operation of the actuator 73 moves the linkage 72, which in turn moves the chain guide 71 relative to the base member 70. The actuator 73 is operated based on wireless control signals from the first shift operating device 14.

In order to receive and process the wireless control signals from the first shift operating device 14, the first bicycle electric transmission device 18 further includes a wireless communication unit or wireless receiver 74 and a controller 76. The term "receiver" as used herein includes a transceiver, transmitter-receiver, or radio, and contemplates any device or devices, separate or combined, capable of receiving wireless signals, including shift signals or control, command or other signals related to some function of the component being controlled. The wireless receiver 74 can be a two-way wireless communication unit if needed and/or desired.

The wireless receiver 74 is configured to wirelessly receive the control signals from the wireless transmitter 46. The controller 76 is operatively connected to the wireless receiver 74. The controller 76 is programmed to periodically operate the wireless receiver 74 for a first predetermined listening period, as explained below, for receiving the control signals from the wireless transmitter 46. The controller 76 is programmed to operate the actuator 73 based on at least one of the control signals being received by the wireless receiver 74. The first bicycle electric transmission device 18 (the second electric component) further includes an on-board power source 77 for supplying electrical power to the electrical parts of the first bicycle electric transmission device 18. The first bicycle electric transmission device 18 further includes an actuator driver 78 and a position sensor 79 for controlling the actuator 73 to accurately position the chain guide 71 with respect to the chainrings of the chainring assembly CR.

The wireless receiver 74 receives the control signals from the wireless transmitter 46, and can recognize the wireless control signals based on the particular frequency of the control signal and/or an identifier included in the control signal. As explained below, the controller 76 controls the wireless receiver 74 such that one signal receiving operation of the wireless receiver 74 comprises an initial operation, a closing operation, and an interval between the initial operation and the closing operation. Due to the interval in each signal receiving operation, the operating time of the wireless receiver 74 is reduced. Thus, the electricity consumption of the first bicycle electric transmission device 18 can be reduced.

The controller 76 is preferably a micro-computer that includes conventional components such as includes a central processing unit (CPU), an input interface circuit, an output interface circuit, and storage devices such as a ROM (Read Only Memory) device, a RAM (Random Access Memory) device and/or a FLASH memory device. The controller 76 is programmed to process the wireless control signals received by the wireless control signals from the wireless receiver 74, and the control the operation of the actuator 73 using the actuator driver 78 and the position sensor 79. As explained below, the controller 76 is also programmed to control the operation of the wireless receiver 74 in such a manner to reduce the power consumption of the on-board power source 77.

As seen in FIG. 6, the second bicycle electric transmission device 20 is a rear bicycle derailleur that has a base member 80, a chain guide 81 and a linkage 82. The base member 80 is configured to be attached to the bicycle 1. In particular, the base member 80 is attached to the bicycle frame F adjacent to the cassette CS by a bolt B2. The chain guide 81 is movably supported relative to the base member 80. Specifically, in the illustrated embodiment, the linkage 82 movably supports the chain guide 81 relative to the base member 80. Here, the linkage 82 includes two links that are pivotally connected between the base member 80 and a movably member of the chain guide 81 to forma four-bar linkage.

The chain guide 81 is configured to move the chain C between the sprockets of the cassette CS in response to the operation of the second shift operating device 16 of the bicycle wireless control system 12. More specifically, the second bicycle electric transmission device 20 (the second electric component) further includes an electric motor or actuator 83 that is mechanically connected to the linkage 82. Operation of the actuator 83 moves the linkage 82, which in turn moves the chain guide 81 relative to the base member 80. The actuator 83 is operated based on wireless control signals from the second shift operating device 16.

In order to receive and process the wireless control signals from the second shift operating device 16, the second bicycle electric transmission device 20 further includes a wireless communication unit or wireless receiver 84 and a controller 86. The wireless receiver 84 can be a two-way wireless communication unit if needed and/or desired. The wireless receiver 84 is configured to wirelessly receive the control signals from the wireless transmitter 56. The controller 86 is operatively connected to the wireless receiver 84. The controller 86 is programmed to periodically operate the wireless receiver 84 for a first predetermined listening period, as explained below, for receiving the control signals from the wireless transmitter 56. The controller 86 is programmed to operate the actuator 83 based on at least one of the control signals being received by the wireless receiver 84. The second bicycle electric transmission device 20 (the second electric component) further includes an on-board power source 88 for supplying electrical power to the electrical parts of the second bicycle electric transmission device 20. The second bicycle electric transmission device 20 further includes an actuator driver 88 and a position sensor 89 for controlling the actuator 83 to accurately position the chain guide 81 with respect to the sprockets of the cassette CS.

The wireless receiver 84 receives the control signals from the wireless transmitter 56, and can recognize the wireless control signals based on the particular frequency of the control signal and/or an identifier included in the control signal. As explained below, the controller 86 controls the wireless receiver 84 such that one signal receiving operation of the wireless receiver 84 comprises an initial operation, a closing operation, and an interval between the initial operation and the closing operation. Due to the interval in each signal receiving operation, the operating time of the wireless receiver 84 is reduced. Thus, the electricity consumption of the second bicycle electric transmission device 20 can be reduced.

The controller 86 is preferably a micro-computer that includes conventional components such as includes a central processing unit (CPU), an input interface circuit, an output interface circuit, and storage devices such as a ROM (Read Only Memory) device, a RAM (Random Access Memory) device and/or a FLASH memory device. The controller 86 is programmed to process the wireless control signals received by the wireless control signals from the wireless receiver 84, and the control the operation of the actuator 83 using the actuator driver 88 and the position sensor 89. As explained below, the controller 86 is also programmed to control the operation of the wireless receiver 84 in such a manner to reduce the power consumption of the on-board power source 88.

Figure 7:
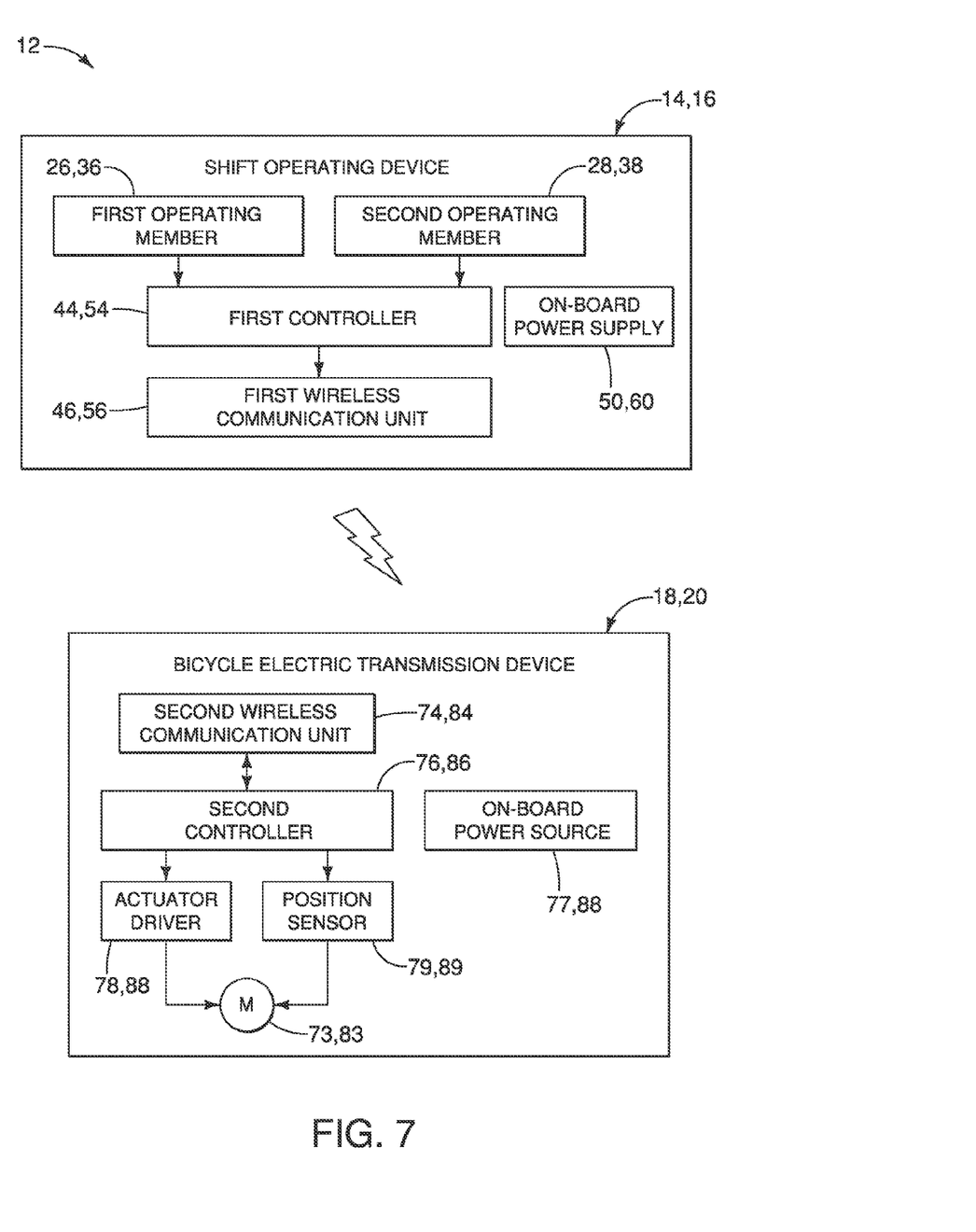
FIG. 7 is a simplified schematic block diagram of an example of the bicycle wireless control system having one of the shift operating devices and one of the bicycle electric transmission devices (e.g., one of the rear and front derailleurs) of the bicycle shown in FIG. 1.

Referring now to FIG. 7, the bicycle wireless control system 12 will now be more generically discussed. As mentioned above, each of the first and second shift operating devices 14 and 16 constitutes a first electric component, while each of the first and second bicycle electric transmission devices 18 and 20 constitutes a second electric component. While the bicycle wireless control system 12 includes two of the first electric components and two of the second electric components, it will be apparent to those skilled in the bicycle field from this disclosure that the bicycle wireless control system 12 can have only one first electric component and one second electric component, or more than two of each of the first and second electric components as need and/or desired. Thus, in its basic form, the first electric components (e.g., the shift operating device 14 or 16) includes at least one operating member (e.g., at least one of the operating members 26, 28, 36 or 38) and a wireless transmitter (e.g., the wireless transmitter 46 or 56) that wirelessly transmits a plurality of control signals in response to a single operation of the at least one operating member (e.g., at least one of the operating members 26, 28, 36 or 38). Also, in its basic form, the second electric component (e.g., the bicycle electric transmission devices 18 or 20) includes a wireless receiver (e.g., the wireless receiver 74 or 84) and a controller (e.g., the controller 76 or 86). In most cases, the second electric component (e.g., the bicycle electric transmission devices 18 or 20) further includes an actuator (e.g., the actuator 73 or 83) in which the controller (e.g., the controller 76 or 86) is programmed to operate the actuator (e.g., the actuator 73 or 83) based on at least one of the control signals being received by the wireless receiver (e.g., the wireless receiver 74 or 84). The second bicycle electric transmission device 20 (the second electric component) further includes an on-board power source receiver (e.g., the on-board power source receiver 77 or 88) for supplying electrical power to the electrical parts of the second electric component (e.g., the bicycle electric transmission devices 18 or 20).

Figure 8:
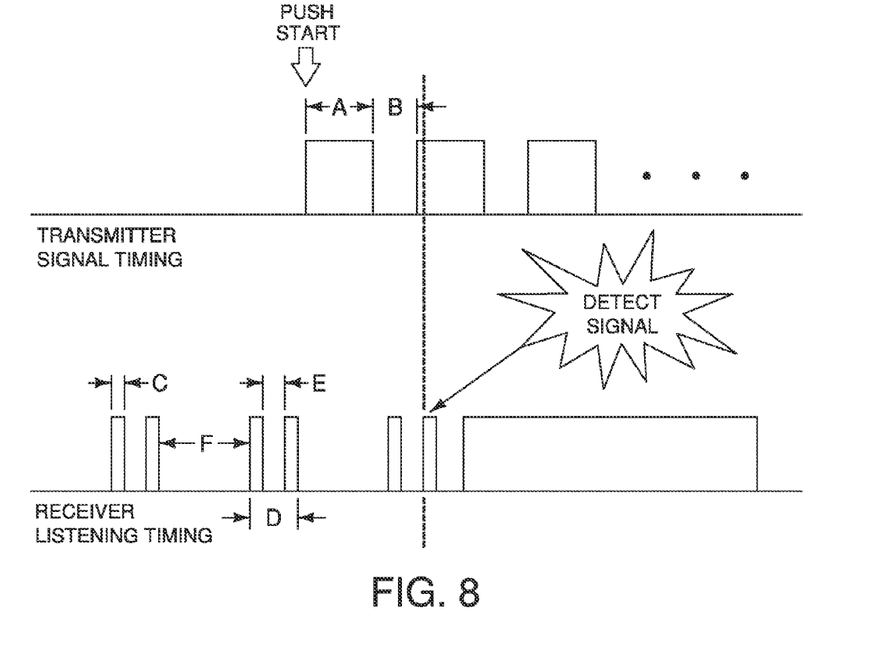
FIG. 8 is a timing diagram illustrating an exemplary relationship between the signals output by the operation of one of the shift operating devices and one of the bicycle electric transmissions.

Referring now to FIG. 8, a timing diagram is illustrated to show the wireless control signals of the wireless transmitter 46 or 56 being received by a corresponding one of the wireless receiver 74 or 84. In other words, this timing diagram applies to both the interaction between the wireless transmitter 46 and the wireless receiver 74 and the interaction between the wireless transmitter 56 and the wireless receiver 84. The wireless transmitters 46 and 56 and the wireless receivers 74 and 84 can respectively communicate each other by using common wireless communication protocol, for example IEEE 802.15.4 communication protocol, but other suitable wireless communication protocol also can be used. It is possible to set the wireless transmitters 46 and 56 and the wireless receivers 74 and 84 to one of a plurality of different selectable transmitter and receiver frequency channels to avoid crosstalk with other systems in the vicinity. The wireless transmitter 46 is paired with the wireless receiver 74 in a conventional manner to enable wireless communication therebetween. Likewise, the wireless transmitter 56 is paired with the wireless receiver 84 in a conventional manner to enable wireless communication therebetween. Alternatively, the wireless receiver 74 could be configured to wirelessly receive the control signals from the wireless transmitter 56, and the wireless receiver 84 could be configured to wirelessly receive the control signals from the wireless transmitter 46.

When one of the operating members 26, 28, 36 or 38 is operated, the wireless transmitter 46 or 56 outputs one or more control signals based on the length of time that the operating members 26, 28, 36 or 38 is held in the operated position. Each of the control signals from the wireless transmitter 46 or 56 is transmitted for a predetermined transmission period A at a predetermined non-transmission interval B between adjacent ones of the control signals. The predetermined transmission period A can be for example 560 microseconds, while the predetermined non-transmission interval B can be for example 430 microseconds.

The wireless receiver 74 or 84 is configured to wirelessly receive the control signals from the wireless transmitter 46 or 56. The controller 76 or 86 is operatively connected to the wireless receiver 74 or 84. The controller 76 or 86 is programmed to periodically operate the wireless receiver 74 or 84 for predetermined listening periods C. The predetermined listening periods C can be for example 90 microseconds. In the embodiment of FIG. 8, the wireless receiver 74 or 84 is placed in a listening mode foe two of the predetermined listening periods C for a predetermined listening period D. The predetermined listening period D can be for example 480 microseconds. The two of the predetermined listening periods C in each of the predetermined listening periods D is separated by an intermediate predetermined non-listening interval E. The intermediate predetermined non-listening interval E can be for example 300 microseconds. Each of the predetermined listening periods D is separated by a predetermined non-listening interval F. The predetermined non-listening interval F can be for example 1450 microseconds. In the illustrated embodiment of FIG. 8, the predetermined listening periods D of the wireless receiver 74 or 84 are greater than the predetermined non-transmission intervals B of the wireless transmitter 46 or 56, and the intermediate predetermined non-listening intervals E of the wireless receiver 74 or 84 are less than the predetermined non-transmission intervals B of the wireless transmitter 46 or 56. Also in the illustrated embodiment of FIG. 8, the predetermined listening periods C is preferably at least smaller than the predetermined transmission periods A. With this relationship, the bicycle wireless control system 12 can reliably receive a control (shifting) signal from the wireless transmitter 46 or 56 of the shift operating device 14 or 16.

In FIG. 8, three of the predetermined listening periods D are illustrated as occurring before detection of one of the control signals of the wireless transmitter 46 or 56. Thus, reaming to FIG. 8, the controller 76 or 86 is programmed to periodically operate the wireless receiver 74 or 84 for a first predetermined listening period D, a second predetermined listening period D, and a third predetermined listening period D. The first predetermined listening period D includes a first initial predetermined listening period C, a first closing predetermined listening period C, and a first intermediate predetermined non-listening interval E. The first intermediate predetermined non-listening interval E is between the first initial predetermined listening period C and the first closing predetermined listening period C. The second predetermined listening period D includes a second initial predetermined listening period C, a second closing predetermined listening period C, and a second intermediate predetermined non-listening interval E between the second initial predetermined listening period C and the second closing predetermined listening period C. A predetermined non-listening interval F is provided between the first and second predetermined listening periods D. The third predetermined listening period D includes a third initial predetermined listening period C, a third closing predetermined listening period C, and a third intermediate predetermined non-listening interval E between the third initial predetermined listening period C and the third closing predetermined listening period C. A predetermined non-listening interval F is provided between the second and third predetermined listening periods D. Here, each of the predetermined listening periods C are equal, each of the predetermined listening periods D are equal, each of the predetermined non-listening intervals E are equal, and each of the predetermined non-listening interval F are equal. Each of the first, second and third intermediate predetermined non-listening intervals E is smaller than the predetermined non-listening interval F.

The predetermined non-transmission intervals B are smaller than each of the first, second and third predetermined listening periods D. The first predetermined listening period D is measured from a start of the first initial predetermined listening period C to an end of the first closing predetermined listening period C. The second predetermined listening period D is measured from a start of the second initial predetermined listening period C to an end of the second closing predetermined listening period C. The third predetermined listening period D is measured from a start of the third initial predetermined listening period C to an end of the third closing predetermined listening period C. Each of the first, second and third intermediate predetermined non-listening intervals E is smaller than the predetermined non-transmission interval B. Each of the first, second and third initial predetermined listening periods C and the first, second and third closing predetermined listening periods C is smaller than the predetermined transmission period A. The first, second and third initial predetermined listening periods C and the first, second and third closing predetermined listening periods C are equal to each other.

The predetermined non-listening interval F satisfies the following equation:

$F < \{(n-1)A + (n-2)B\}$ where:

F is the predetermined non-listening interval;
A is the predetermined transmission period;
B is the predetermined non-transmission interval; and
n is a total number of the control signals during a single operation of
the at least one operating member and is greater than one.

Figure 9:
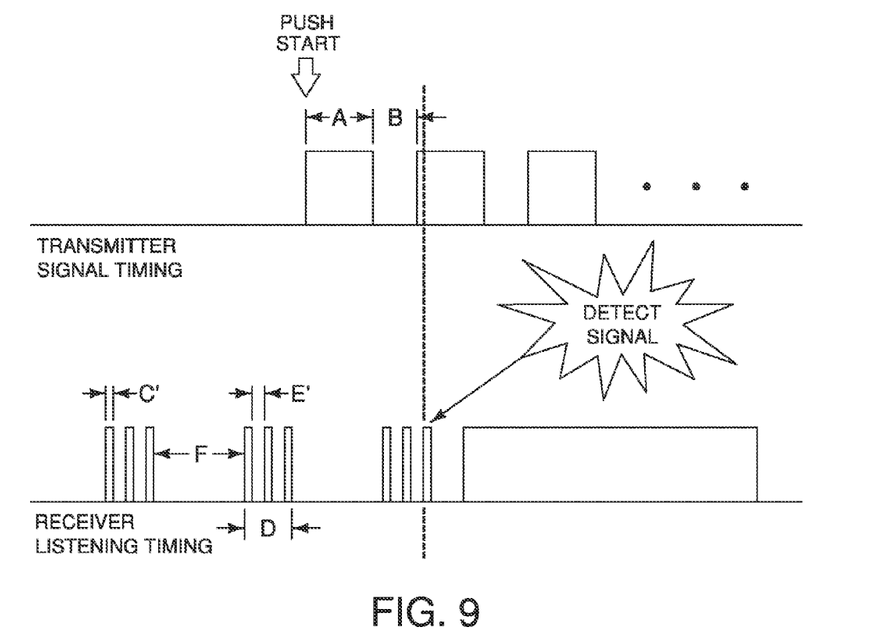
FIG. 9 is another timing diagram illustrating an exemplary relationship between the signals output by the operation of one of the shift operating devices and one of the bicycle electric transmissions.

Referring now to FIG. 9, an alternative timing diagram is illustrated. This timing diagram applies to both the interaction between the wireless transmitter 46 and the wireless receiver 74 and the interaction between the wireless transmitter 56 and the wireless receiver 84. The timing diagram of FIG. 9 is identical to timing diagram of FIG. 8, except that each of the predetermined listening periods D further includes an additional predetermined listening period C' between an initial predetermined listening period C' and a closing predetermined listening period C', and two intermediate predetermined non-listening interval E' separating the additional predetermined listening period C' from the initial predetermined listening period C' and the closing predetermined listening period C'.

In FIG. 9, three of the predetermined listening periods D are illustrated as occurring before detection of one of the control signals of the wireless transmitter 46 or 56. Thus, the first predetermined listening period D further includes a first additional predetermined listening period C' between the first initial predetermined listening period C' and the first closing predetermined listening period C. The second predetermined listening period D further includes a second additional predetermined listening period C' between the second initial predetermined listening period C' and the second closing predetermined listening period C. The third predetermined listening period D further includes a third additional predetermined listening period C' between the third initial predetermined listening period C' and the third closing predetermined listening period C'.

While only selected embodiments have been chosen to illustrate the present invention, it will be apparent to those skilled in the art from this disclosure that various changes and modifications can be made herein without departing from the scope of the invention as defined in the appended claims. For example, while the initial and closing predetermined listening periods C are the same (e.g., 90 microseconds) in the illustrated embodiments, the invention is not limited to the illustrated embodiments. In particular, the initial predetermined listening periods C can be different from the closing predetermined listening period C. However, to accomplish the same energy reduction as the illustrated embodiments, preferably the total length of the initial and closing predetermined listening periods C would be equal to desired listening periods of the illustrated embodiments (e.g., 180 microseconds for the illustrated embodiments). For example, if the initial predetermined listening period C is 100 microseconds, then the closing predetermined listening period C is 80 microseconds. Of course, it will be apparent from this disclosure that the total length of the initial and closing predetermined listening periods C can be set as desired. For example, the initial predetermined listening period C can be set to 90 microseconds, while the closing predetermined listening period C can be set to 100 microseconds for a total length of 190 microseconds for each of the (predetermined listening period D. However, extending the total length of the initial and closing predetermined listening periods C is not preferable from a viewpoint of reducing energy consumption.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion,"

"member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle wireless control system. Accordingly, these directional terms, as utilized to describe the bicycle wireless control system should be interpreted relative to a bicycle in an upright riding position on a horizontal surface and that is equipped with the bicycle wireless control system. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

The foregoing descriptions of the embodiments according to the present invention are provided for illustration only, and not for the purpose of limiting the invention as defined by the appended claims and their equivalents.

What is claimed is:

1. A bicycle wireless control system comprising:
a first electric component of a bicycle including at least one operating member and a wireless transmitter that wirelessly transmits a plurality of control signals in response to a single operation of the at least one operating member, each of the control signals being transmitted for a predetermined transmission period at a predetermined non-transmission interval between adjacent ones of the control signals; and
a second electric component of the bicycle, remote from the first electric component, including a wireless receiver that is configured to wirelessly receive the control signal and a controller operatively connected to the wireless receiver to use the control signal to control the second electric component,
the controller being programmed to periodically operate the wireless receiver for a first predetermined listening period including a first initial predetermined listening period, a first closing predetermined listening period, and a first intermediate predetermined non-listening interval between the first initial predetermined listening period and the first closing predetermined listening period; and
the controller being programmed to periodically operate the wireless receiver for a second predetermined listening period including a second initial predetermined listening period, a second closing predetermined listening period, and a second intermediate predetermined non-listening interval between the second initial predetermined listening period and the second closing predetermined listening period,
a predetermined non-listening interval being provided between the first and second predetermined listening periods,
each of the first and second intermediate predetermined non-listening intervals being smaller than the predetermined non-listening interval.

2. The bicycle wireless control system according to claim 1, wherein
the predetermined non-transmission interval is smaller than each of the first predetermined listening period and the second predetermined listening period as either measured from a start of the first initial predetermined listening period to an end of the first closing predetermined listening periods or measured from a start of the second initial predetermined listening period to an end of the second closing predetermined listening period.

3. The bicycle wireless control system according to claim 1, wherein
the predetermined non-listening interval satisfies:

$$F<\{(n-1)A+(n-2)B\} \text{ where:}$$

F is the predetermined non-listening interval;
A is the predetermined transmission period;
B is the predetermined non-transmission interval; and
n is a total number of the control signals during a single operation of the at least one operating member and is greater than one.

4. The bicycle wireless control system according to claim 1, wherein
each of the first and second intermediate predetermined non-listening intervals is smaller than the predetermined non-transmission interval.

5. The bicycle wireless control system according to claim 1, wherein
each of the first and second initial predetermined listening periods and the first and second closing predetermined listening periods is smaller than the predetermined transmission period.

6. The bicycle wireless control system according to claim 1, wherein
the first and second initial predetermined listening periods and the first and second closing predetermined listening periods are equal to each other.

7. The bicycle wireless control system according to claim 1, wherein
the second electric component is a bicycle derailleur having a base member configured to be attached to a bicycle, a chain guide movably supported relative to the base member and a linkage movably supporting the chain guide relative to the base member.

8. The bicycle wireless control system according to claim 7, wherein
the bicycle derailleur is a front bicycle derailleur.

9. The bicycle wireless control system according to claim 7, wherein
the bicycle derailleur is a rear bicycle derailleur.

10. The bicycle wireless control system according to claim 1, wherein
the second electric component includes an on-board power source.

11. The bicycle wireless control system according to claim 1, wherein
the second electric component includes an actuator, the controller being programmed to operate the actuator based on at least one of the control signals being received by the wireless receiver.

12. The bicycle wireless control system according to claim 1, wherein
the first predetermined listening period further includes a first additional predetermined listening period between the first initial predetermined listening period and the first closing predetermined listening period.

13. The bicycle wireless control system according to claim 12, wherein
the second predetermined listening period further includes a second additional predetermined listening period between the second initial predetermined listening period and the second closing predetermined listening period.

\* \* \* \* \*